INVENTORS
OTTO KAHLE
RALF BAUER

INVENTORS
OTTO KAHLE
RALF BAUER

INVENTORS
OTTO KAHLE
RALF BAUER

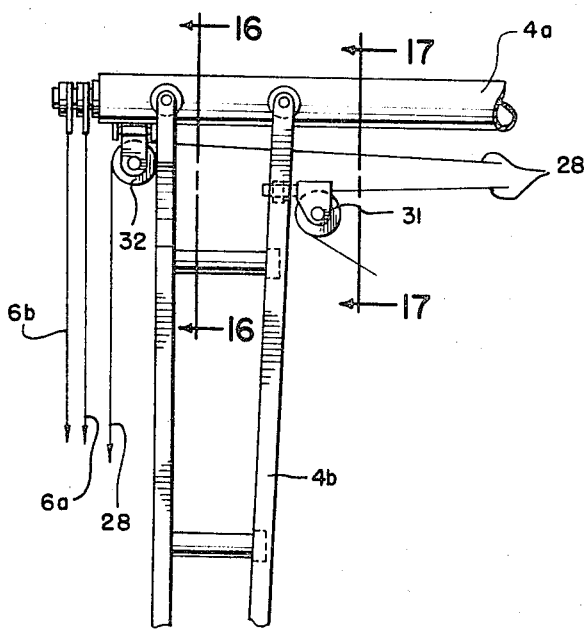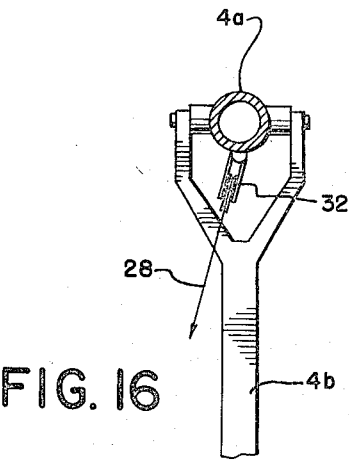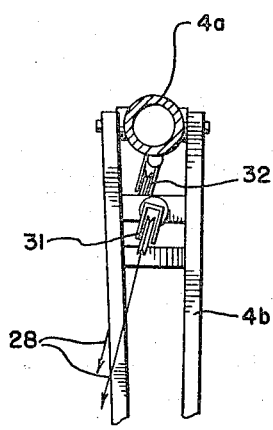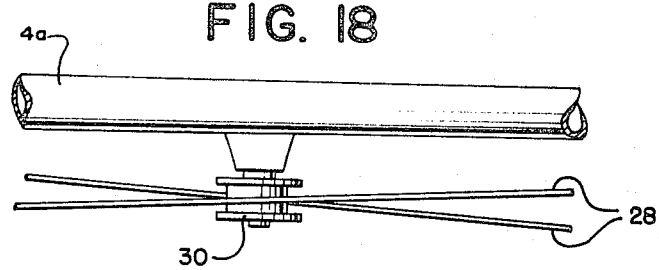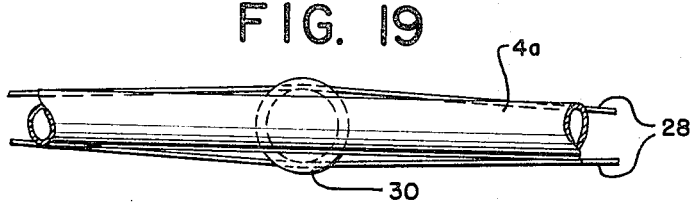
INVENTORS
OTTO KAHLE
RALF BAUER

United States Patent Office 3,429,453
Patented Feb. 25, 1969

3,429,453
CRANE INSTALLATIONS PARTICULARLY FOR FREIGHTERS
Otto Kahle, Rostock, and Ralf Bauer, Warnemunde, Germany, assignors to VEB Warnowwerft Warnemunde, Warnemunde, Germany
Filed Oct. 25, 1967, Ser. No. 677,995
U.S. Cl. 212—8      12 Claims
Int. Cl. B66c 23/00, 23/52, 5/02

ABSTRACT OF THE DISCLOSURE

A crane installation in the form of a gantry crane particularly adapted for use on freighters provided with relatively wide and short hatches. The installation includes a column means having upper and lower ends and a transverse means extending laterally from and fixed to the upper end of the column means to form a gantry crane therewith. A pivot means is carried by the lower end of the column means and a pair of converting means are removably and selectively connectable with the lower end of the column means, at the pivot means, to provide a pair of parallel swing axes which extend parallel to the traverse means, and thus the gantry crane is swingable selectively about one or the other of the parallel swing axes, which are spaced from each other, so that in this way it is possible to change the location of the gantry crane. At either of these swing axes the gantry crane is swingable between a pair of end positions where the crane is respectively located in end planes which intersect each other and contain the particular swing axis, and these end planes respectively form predetermined angles with a vertical plane which contains the particular swing axis. A pull-cable means is connected to the gantry crane in the region of the upper end of the column means for swinging the latter about one or the other of the swing axes, and a pair of outer cable guide means respectively coact with the pull-cable means to provide a pair of turning points for the latter, one of these outer cable guide means coacting with the pull-cable when the crane is supported for swinging movement about that one of the swing axes which is nearer to this one cable guide means, while the other cable guide means coacts with the pull-cable means when the crane is swingable about the other swing axis which is nearer to this other cable guide means. Depending upon which connecting means is used, the pair of outer cable guide means are situated in planes which bisect the angle between one of the end planes and the vertical plane which contains the particular swing axis which is used. An intermediate cable guide means also is provided to coact with the cable means, irrespective of which the swing axis is used, and this intermediate cable guide means is situated in a plane which bisects the angle between the other of said end planes and the vertical plane which contains the particular swing axis which is used.

Background of the invention

The present invention relates to crane installations.

In particular, this invention relates to tiltable gantry cranes, and the present invention deals in particular with a tiltable gantry crane which can be displaced from one operating location to another operating location with this displacement being brought about in part by operation of pull-cables of the crane installation.

In order to accelerate the handling of cargo freighters, particularly for piece goods, they are provided with permanently open, relatively large hatches, so that the freight can be initially loaded directly at its final location in the ship and can be removed directly from the latter location to be displaced from the ship.

Such ship openings are limited by the required strength criteria of the hull of the ship, namely its longitudinal strength, its torsional strength, and the like. With criteria of this latter type in mind, it becomes possible to achieve for a freighter of the above type a relatively high degree of unobstructed openings through which the freight is moved by providing wide hatch openings which, however, have a relatively short length, so that the hatches extend longitudinally almost up to the outer hull while being spaced from each other by relatively short distances. However, with such an arrangement it is no longer possible to situate between the hatches an otherwise conventional winch housing and cranes with the required winches, inasmuch as there is insufficient space available for such structure.

The use of luffing cranes also presents disadvantages. In the first place such cranes are expensive, and in the second place with a hatch arrangement of the above type, where the hatches are substantially shorter than the width of the ship, because of the necessary extension of the load over the deck of the ship extremely long extensions are required for the crane. Such long extensions cannot, however, be used at the operating region of the ship because of the relatively short hatches. Furthermore, such construction results in undesirably large masses, relatively small operating speeds, and frequent tilting of the crane so that the required operating time for the crane becomes undesirably large.

It has been proposed to avoid such disadvantages by arranging such luffing cranes for movement transversely of the ship. Such transversely movable luffing cranes also require, however, a considerable amount of space, have undesirably large masses, and are extremely expensive.

There are known tiltable gantry cranes which, by means of pull-cables, can be turned through an angle of 180°, with the bottom ends of such a gantry crane being displaceable between different locations so as to change the operating location of the crane without requiring re-threading of the pull-cables. Such cranes can, for the purpose of changing their operating location, be displaced only by means of exterior devices such as, for example, another crane which is capable of moving the gantry crane from one operating location to another. Moreover, there are known tiltable gantry cranes provided with hydraulic operating cylinders situated at the columns of the crane for tilting the crane. However, for relatively large crane extensions and relatively large loads such gantry cranes are not suitable. Moreover, the displacement of such a crane from one operating location to another cannot be carried out without an undesirably excessive extent of work.

Summary of the invention

It is accordingly a primary object of the present invention to provide a tiltable gantry crane which is capable of carrying a relatively large load while at the same time being inexpensive and of a light weight, and avoiding all of the above disadvantages.

Thus, it is an object of the invention to provide a tiltable gantry crane which has relatively small dimensions, when compared with the work which can be carried out with the crane, while at the same time requiring only simple structures in order to situate the crane at one of a plurality of different operating locations.

Furthermore, it is an object of the invention to provide a crane of this type which, when it is not operating and locked in its inoperative position, for example, provides very little limitation on the view from the bridge while the ship is at sea, and on the other hand, when the ship is in harbor, provides practically no hindrance to the handling of cargo with laterally arranged cranes while at the same time being capable of being exchanged for other cargo handling devices having small or larger carrying capacities, with very few manipulations required for such an exchange.

In accordance with the invention the above objects are achieved by using a gantry crane having a column means which may be composed of one or two columns, this column means having upper and lower ends, and a traverse means is fixed to and extends laterally from the upper end of the column means to form the gantry crane therewith. A pivot means is operatively connected to the lower end of the column means to support the latter for swinging movement about an axis parallel to the traverse means, and a pull-cable means is operatively connected to the gantry crane at the region of the upper end of the column means so as to tilt the crane from its vertical position about the swing axis provided by the pivot means either to the right or to the left. A cable guide means is provided to guide the cable means for movement about predetermined points where suitable guide sheaves or winches may be located, and a pair of outer cable guide means of this type are provided together with an intermediate cable guide means situated between the pair of outer guide means. The gantry crane is capable of being tilted about its swing axis between a pair of end planes, and one of the outer cable guide means is situated in a plane which bisects the angle between one of the end planes and a substantially vertical plane which contains the swing axis of the crane, while the intermediate cable guide means is situated in a plane which bisects the other of the end planes and the vertical plane.

For the purpose of changing the operating location of the crane the pivot means for the latter is removably connected to one of a pair of connecting means, and the gantry crane can be shifted from one connecting means to another location where the lower end of the column means is connected to a second connecting means which provides for the pivot means of the crane a second swing axis parallel to the first swing axis. At this location also the crane is tiltable about this second swing axis between a pair of end planes, and the same intermediate cable guide means is situated in a plane which bisects one of the latter end planes and a substantially vertical plane which contains this second swing axis. In this case, however, the other of the outer cable guide means is situated in a plane which bisects the angle between the other end plane and the latter vertical plane which includes the second swing axis.

A column guide means is capable of being situated in the region of one or the other of the outer cable guide means to coact with the column means to guide the latter for turning movement about an axis parallel to the swing axes and for longitudinal shifting movement. When one of the connecting means is disconnected and a column guide means is operatively connected to the column means the pull-cable means is capable of being operated to shift the lower end of the column means from one swing axis to the other swing axis while the column means is longitudinally guided and turns about the column guide means, and when the lower end of the column means has been situated at the other swing axis the pivot means is operatively connected to the other connecting means so that now the crane can be operated at the other of the operating locations.

In this way through simple manipulations of the pull-cable means and through connection and disconnection of the pivot means and the column guide means it is possible to quickly and easily change the operating location of the crane. At each operating location the swing axis of the crane is situated midway between the outermost positions of the traverse means when the crane is located in the opposed end planes, so that in this way the column means need only have a minimum length in order to bring about the desired operations toward the left and right.

The intermediate cable guide means which coacts with the pull-cable means irrespective of which swing axis is used is situated in a vertical plane which is situated midway between and extends parallel to the pair of swing axes which can be selectively used for the crane.

*Brief description of drawings*

The invention is illustrated by way of example in the accompanying drawings which form part of this application and in which:

FIG. 15 shows part of the structure of FIG. 14 at an enlarged scale to illustrate the manner in which the load cables are guided;

FIG. 16 is a transverse section of the structure of FIG. 15 taken along line b—b of FIG. 15;

FIG. 17 is a transverse section of the structure of FIG. 15 taken along line c—c of FIG. 15;

FIG. 18 illustrates the arrangement of guide rollers on the traverse beam of the gantry crane; and FIG. 19 is a top plan view of the structure of FIG. 18 as seen in the direction of arrow Z.

Description of preferred embodiments

Figure 1:
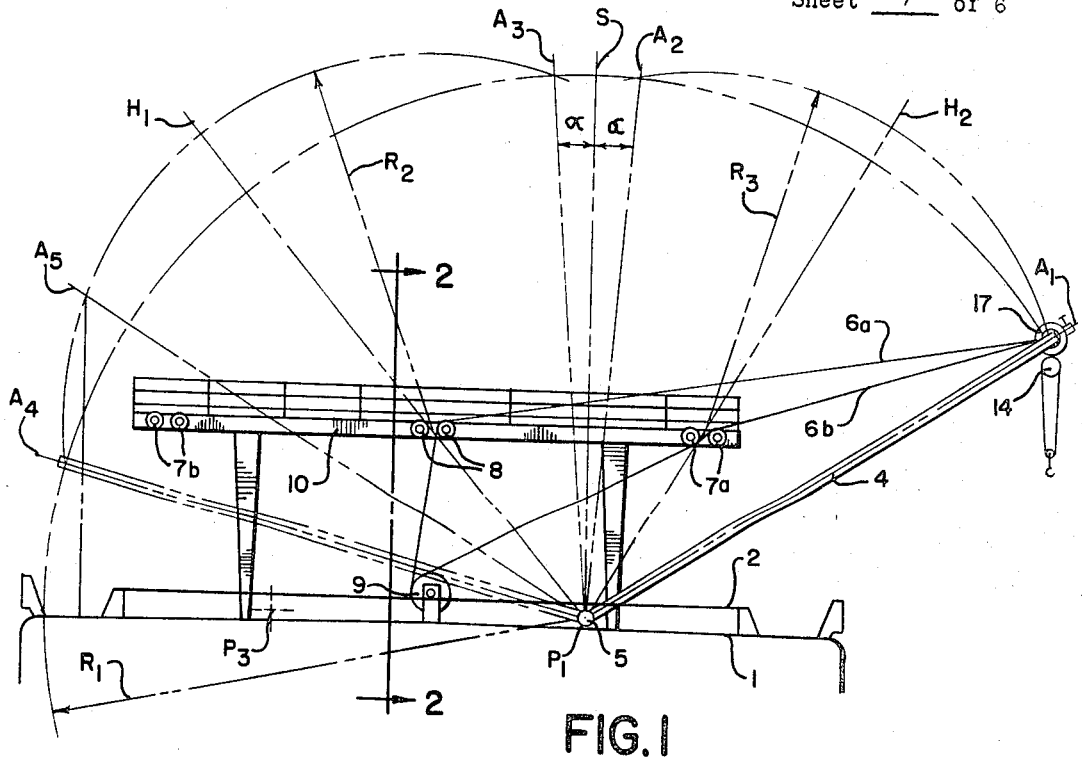
FIG. 1 is a schematic elevation taken transversely across the deck of a ship and illustrating one possible crane installation according to the invention.
Figure 2:
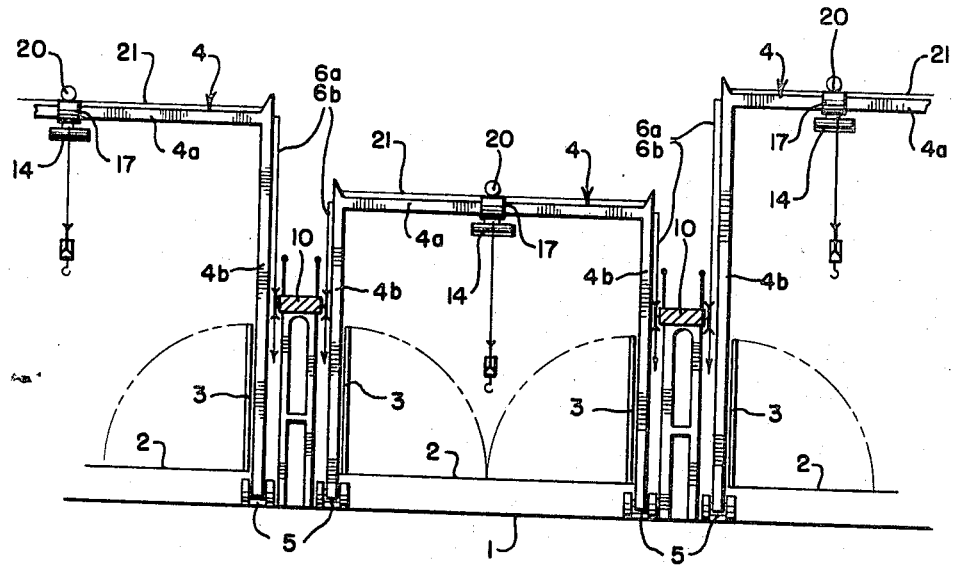
FIG. 2 is a fragmentary longitudinal section taken longitudinally of the ship along line a—a of FIG. 1 and showing crane installations of the invention at different operating positions.

Referring now to FIGS. 1 and 2, it will be seen that there is illustrated therein, in a schematic manner, the deck 1 of a ship, this deck being formed with hatches 2 which preferably have a width greater than their length. As is indicated schematically in FIG. 2, the hatches 2 can, for example, be closed by way of hatch covers 3. Situated over each hatch is a gantry crane 4 formed by a traverse means 4a in the form of a traverse beam and by a column means which in the illustrated example includes a pair of parallel end columns 4b fixed at their upper ends to the transversely extending traverse beam 4a. A pivot means 5 coacts with the lower ends of the column means 4b to support the latter, and thus the entire gantry crane 4, for swinging movement about a predetermined axis which extends normal to the plane of FIG. 1 and which in the position of the parts shown in FIG. 1 extends through a connecting means at the point $P_1$. The pivot means 5 provides for the crane 4 a swing axis which is parallel to the traverse means 4a. In the manner which is described below the pivot means 5 can optionally be connected to a connecting means situated at the location $P_3$, instead at the illustrated location $P_1$, so that the swing axis for the crane can be shifted from the location $P_1$ to the location $P_3$, thus providing a pair of operating locations for the crane 4.

A pull-cable means is operatively connected to the crane 4 at the region of the upper ends of the column means 4b in order to swing the crane about its swing axis determined by the pivot means 5, and in the illustrated example the pull-cable means includes a pair of pull-cable 6a and 6b.

A pair of outer cable guide means 7a and 7b, each in the form of a pair of rollers or sheaves between which the cable 6b is guided, are provided for guiding the pull-cable means, and the cable guide means 7a coacts with the cable 6b when the pivot means 5 is at the location $P_1$ while the cable guide means 7b coacts with the cable 6b when the pivot means 5 is at the location $P_3$. In the illustrated example the cable 6b travels around the outer cable guide means 7a to the winch 9, and in the same way when the pivot means 5 is at the location $P_3$ the cable 6b is guided around the cable guide means 7b to the winch 9. However, it is possible, if desired, to situate a pair of winches corresponding to the winches 9 directly at the locations of the outer cable guide means 7a and 7b, so that in this way winches themselves may form the pair of outer cable guide means.

An intermediate cable guide means 8 is situated between the pair of outer cable guide means 7a and 7b and has a construction identical with the latter so that in the illustrated example the intermediate cable guide means 8, which is situated midway between the pair of outer cable guide means 7a and 7b, is composed of a pair of pulleys or sheaves between which the cable 6a of the pull-cable means is guided, this cable 6a also being wound on and paid out from the winch 9. If the pivot means 5 is transferred to the location $P_3$ to change the operating location of the crane 4, then the pull-cable 6a is still guided by the intermediate cable guide means 8, and in this case also it is possible to form the latter directly as a winch onto which the cable 6a is directly wound and from which it can be unwound.

As may be seen from FIG. 2, a plurality of stationary platforms 10 are fixed to the ship and are respectively situated between the successive cranes 4, so that a pair of stationary platforms 10 are situated at the opposed ends of each crane adjacent to the column means thereof. This elongated platform 10 which extends transversely of the ship between a pair of adjoining cranes and between a pair of hatches 2 provides an elevated location for the operator from which various controls for controlling the operation of the cranes may be actuated. The cable guide means 7a, 7b and 8 are mounted on stationary platform 10 for the operator of the cranes, and the platform 10 carries a suitable control stand from which the controls for the crane installations can be manipulated. For this purpose the platform 10 is constructed so that the operator can walk along the platform 10 between a pair of cranes, as is apparent from FIG. 2. Thus, with such an arrangement where a plurality of gantry cranes 4 are arranged one after the other, the platforms 10 each serve to support pairs of outer cable guide means 7a and 7b and a pair of intermediate cable guide means 8 of a pair of successive gantry cranes 4.

Figure 9:
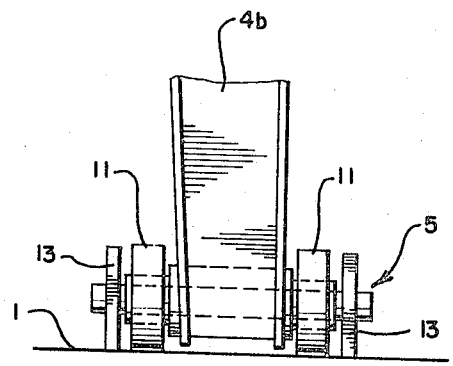
FIG. 9 also shows on an enlarged scale details of the structure of FIG. 3, FIG. 9 being taken along line c—c of FIG. 3 in the direction of the arrows.

As is shown in FIG. 9, the pivot means 5 includes an elongated pin carrying a pair of rollers 11 at the bottom end of each column, and each connecting means include a removable pin 12 which can be inserted in an axial bore of the pin which carries the rollers 11 so as to fix the location of the pivot means 5. A pair of such removable lock pins 12 are removably carried by fixed plates 13 of the connecting means and can respectively be introduced through openings of the plates 13 into openings at the end of the pivot pin which carries the rollers 11. The pivot pin of the pivot means 5 carries a suitable bearing or bushing which is received in an opening at the lower end of each column on which the column is turnable. In this way the pivot means 5 is removably connectable with the pair of connecting means since the pins 12 which determine the locations of the pivot means are removably connectable to the pivot means 5 of the column.

Figure 5:
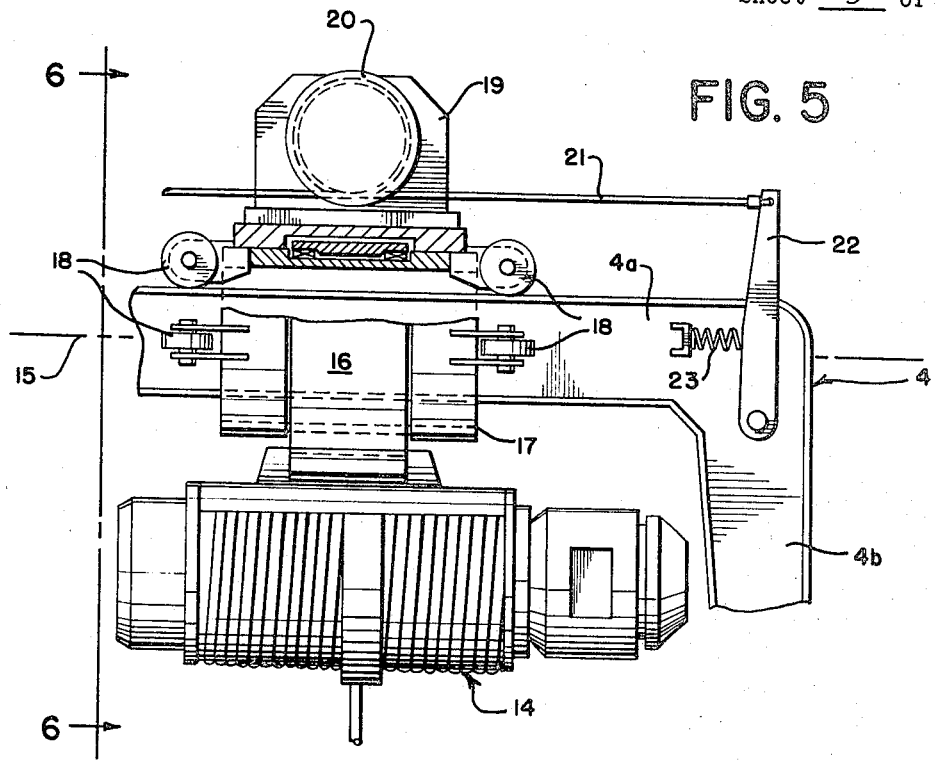
FIG. 5 is a fragmentary elevation taken in the direction of the arrow X of FIG. 3 and showing on an enlarged scale the travelling hoist which is carried by the traverse beam of the gantry crane.
Figure 6:
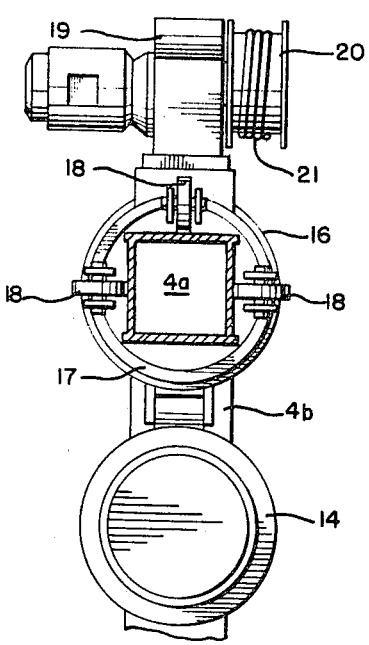
FIG. 6 is a fragmentary sectional elevation of the structure of FIG. 5 taken along line d—d of FIG. 5 in the direction of the arrows.

As is apparent from FIGS. 2 and 5 the upper traverse means 4a of each crane 4 supports a travelling hoist 14 for longitudinal movement therealong between the columns 4b. The travelling hoist 14 is supported for angular movement about the axis 15 of the traverse means 4a or about an axis parallel to the axis 15. For this purpose the travelling hoist 14 hangs from a ring 16 which is supported for turning movement about the axis 15 on a carriage 17 which is capable of moving longitudinally along the traverse means. This carriage 17 is provided with rollers 18 which roll along exterior flat surfaces of the traverse means. As is apparent from FIG. 6 the traverse means is of a square or rectangular configuration in cross section, and the rollers 18 engage the upper face and the opposed side faces of the traverse means in the illustrated example, so that in this case the rollers 18 engage three sides of the traverse means 4a of the crane. As a result of this construction the carriage 17 will necessarily participate in the swinging movements of the gantry crane 4 and the rollers 18 will alternately carry the structure depending upon the direction of swing. The carriage 17 carries a drive 19 which is provided with a cable drum 20.

According to whether the cable drum 20 is rotated in a clockwise or counterclockwise direction the travelling hoist 14 will be shifted to the left or right, so that the cable 21 is wound at one side onto and at the other side paid out from the drum 20. The ends of the cable 21 are fixed to the upper ends of a pair of levers 22 supported for turning movement at their lower ends in the region of the outer ends of the traverse means and acted upon by compression springs 23 which act to hold the cable 21 under a preliminary tension so as to compensate for inaccuracies, cable elongation, and the like.

Figure 7:
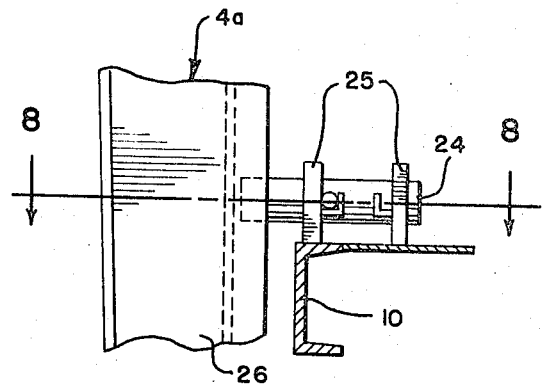
FIG. 7 is a sectional elevation at an enlarged scale of a detail of the structure of FIG. 3 and is taken along line b—b of FIG. 3 in the direction of the arrows, FIG. 7 showing the structure at an enlarged scale as compared to FIG. 3.
Figure 8:
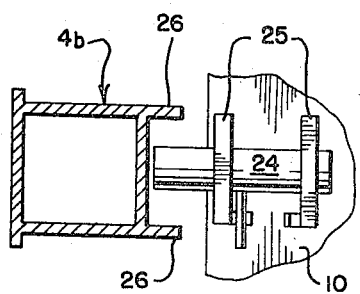
FIG. 8 is also a fragmentary sectional illustration of a detail of the structure, FIG. 8 being taken along line e—e of FIG. 7 in the direction of the arrows.

A column guide means 24 coacts with the column means 4b for a purpose described below. Thus, as may be seen from FIG. 3 the column guide means 24 is situated in the region of the outer cable guide means 7a. When the crane turns about a swinging axis located at the location $P_3$, then the column guide means 24 will be located at the region of the other cable guide means 7b. The cable guide means 24 is in the form of an elongated pin extending turnably and longitudinally slidable through openings of a pair of fixed brackets 25, as shown in FIGS. 7 and 8, and the left free end of the pin 24 can be situated in a groove formed by the outer free edges of the walls 26 of the column 4b. As a result when the guide means 24 has the operating position shown in FIGS. 7 and 8 the column means will be guided for turning movement about the pin 24 while at the same time being capable of shifting longitudinally along the pin 24. As is apparent from FIG. 7, the pin 24 can be turned to displace a transverse projection at the exterior thereof out of a hook carried by the left plate 25 into a hook carried by the right plate 25 of FIGS. 7 and 8, so as to hold the pin 24 in its inoperative position. When it is desired to change the location of the crane from one operating position to another the pin 24 is shifted to the operating position thereof shown in FIGS. 7 and 8.

When the crane 4 is supported for swinging movement about a swing axis at the location $P_1$, as shown in FIG. 1, then the crane can be swung between a pair of end positions situated at the end planes $A_1$ and $A_4$ which intersect each other at and include the swing axis situated at the location $P_1$. The swing axis at this time is located in a vertical plane S which, because of rolling of the ship, will swing between the planes $A_2$ and $A_3$ situated from the vertical plane by the angles $\alpha$ as shown in FIG. 1. The location of the outer cable guide means 7a is selected so that it is situated in a plane $H_2$ which contains the swing axis and which bisects the angle between the end plane $A_3$ and the substantially vertical plane $S,A_2,A_3$ depending upon the angular position of the ship in roll. When the pivot means 5 is located at the location $P_3$, then the outer cable guide means 7b will be situated in a plane which contains the swing axis at the location $P_3$ and which bisects the angle between the end plane $A_4$ and the substantially vertical plane which contains the swing axis at the location $P_3$. The intermediate cable guide means 8 is located in a plane $H_1$ which bisects the angle between the plane $A_4$ and the vertical plane $A_3$ in the position of the parts shown in FIG. 1, and when the pivot means 5 is at the location $P_3$ the plane in which the cable guide means 8 is located will bisect the angle between the plane $A_1$ and the substantially vertical plane.

The elevation of the intermediate cable guide means 8 is determined by the intersection between the bisecting plane $H_1$, which contains the swing axis, and a vertical plane which is situated midway between the locations $P_1$ and $P_3$ and which extends parallel to the pair of parallel swinging axes. The pair of outer cable guide means 7a and 7b are located at the same elevation as the intermediate cable guide means 8. The situation of the location $P_1$ for one of the swing axes is selected in such a way that it is situated equidistantly from a pair of vertical planes which respectively contain the traverse means 4a when the crane is situated in the end planes $A_1$ and $A_4$. In this way it is possible to provide the column means 4b with the shortest length. As a result of the above geometrical relationships with respect to the locations of the cable guide means 7a, 7b and 8, substantial advantages are achieved during swinging of the crane with respect to the movements of the components of the installation.

Thus, referring to FIG. 1, during swinging from the plane $A_1$ to the plane $A_2$, it is only necessary to actuate the pull-cable 6a. It is unnecessary to provide any movement in the pull-cable 6b since the radius $R_3$ describes an arc which differs only to a small extent from the arc described by the radius $R_1$.

When the crane has reached the plane $A_2$ and turns further into the plane $A_3$ (which, when taking into consideration the possible rolling of the ship, provides for the crane a substantially vertical position), then up to the plane $A_3$ the pull-cable 6a is further wound up onto the winch while the pull-cable 6b is withdrawn therefrom.

When the crane turns from the plane $A_3$ to the opposite end plane $A_4$, then the pull-cable 6a is no longer used and the crane swing is simply braked by paying out of the cable 6b, since at this time the radius $R_2$ describes an arc which does not differ essentially from the arc formed by the radius $R_1$. Thus, over the entire range of swinging movement of the gantry crane the pull-cables 6a and 6b of the pull-cable means can be considered as operating only alternately so as to provide great simplifications in the controls.

Figure 3:
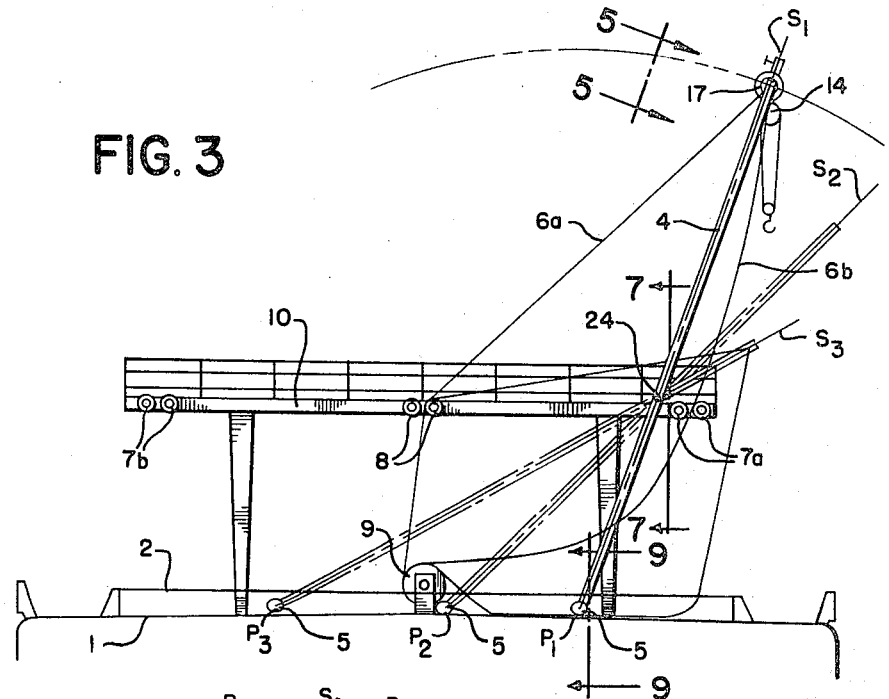
FIG. 3 is also a schematic transverse sectional elevation taken transversely of the deck of the ship and illustrating a crane installation of the invention during movement of the crane from one operating location to another operating location.
Figure 4:
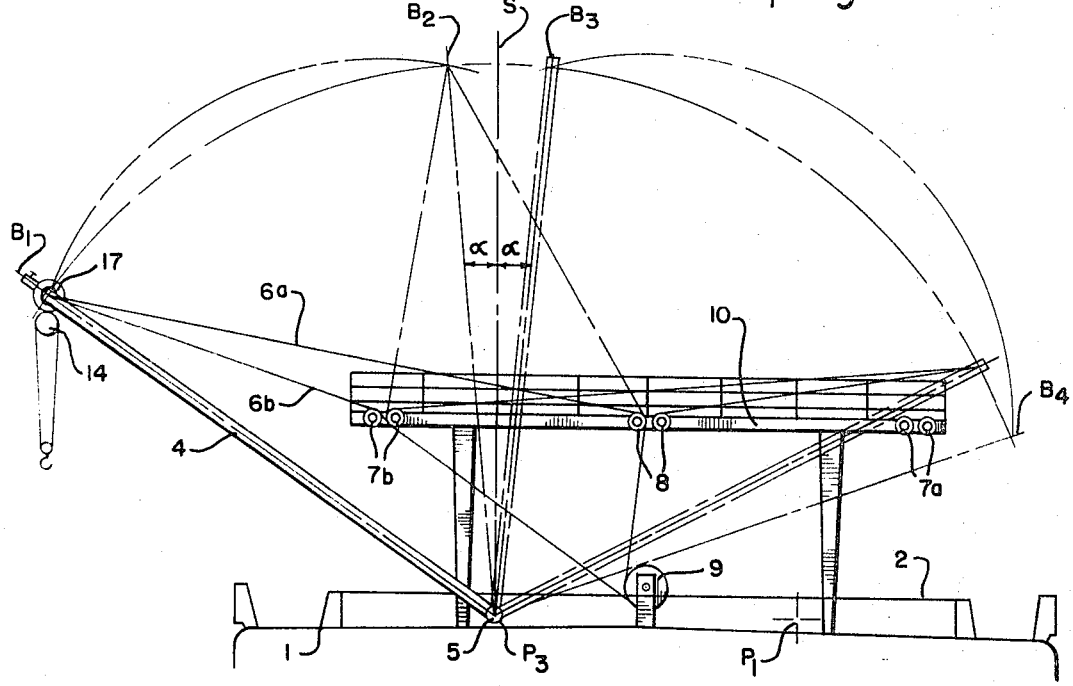
FIG. 4 shows the structure of FIG. 3 after the crane has been displaced to the other operating location.

Referring now to FIGS. 3 and 4, if the gantry crane 4 is to be moved from the operating location of FIG. 1 to the operating location of FIG. 4, then it is necessary to relocate the pivot means 5 and the bottom end of the column means at the location $P_3$. For this purpose the crane is first turned to the plane $S_1$ indicated in FIG. 3 so that the column means extends in the region of the outer cable guide means 7a where the column guide means 24 is located. When the crane has been tilted so as to occupy the plane $S_1$ shown in FIG. 3 the pin 24 is moved to the position thereof shown in FIGS. 7 and 8 so as to prevent turning of the crane inasmuch as the pin 24 is now located in the groove formed by the free edges of the plates 26 shown in FIG. 8. Now the lock bolts 12 are removed at the location $P_1$ and the pull-cable 6b is removed from the outer cable guide means 7a. Of course, these operations are repeated at both of the columns.

By pulling on the pull cable 6a, by turning the winch 9 so as to wind the pull-cable 6a onto the winch 9, the crane swings in a clockwise direction, as viewed in FIG. 3, about the pins 24 coacting with the columns thereof and at the same time the crane shifts longitudinally downwardly toward the left while the rollers 11 advance to the left along the deck until they reach the location $P_3$. At this time the crane will occupy the plane $S_3$ shown in FIG. 3 after having been advanced through the plane $S_2$. After the pull-cable 6b has been introduced into the other outer cable guide means 7b and the pins 12 have been introduced into the pin which carries the rollers 11 and which is now so situated at the location $P_3$, these pins 12 being introduced into openings at the plates 13 located at the location $P_3$, the pivot means 5 is arrested where its axis is at the location $P_3$, and now the crane can be operated so as to swing about a swing axis located at the location $P_3$. The parts are shown in this position in FIG. 4 where the crane can be operated between the end planes $B_1$ and $B_4$ which correspond to the end planes $A_1$ and $A_4$, with the other indications of FIG. 4 corresponding to those of FIG. 1 except that now the crane will swing about an axis at the location $P_3$.

Figure 10:
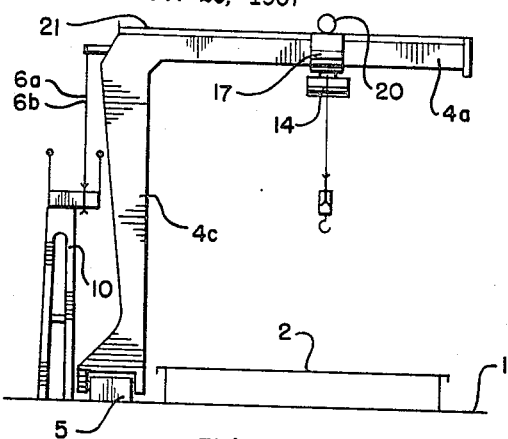
FIG. 10 is a fragmentary longitudinal elevation taken in the same plane as that of FIG. 2 but showing an embodiment of the invention where the crane has only one column.

With the above-described structure all of the above features with respect to one column are duplicated at the other column. However, it is possible to maintain the above-described operation with a gantry crane provided with only a single column structure at one end of the traverse means. Thus, particularly where the traverse means has a relatively short length it is possible to support the traverse means in cantilever fashion at only one end by way of a column means 4c which is highly resistant to bending, so that each gantry crane will in this case be controlled from only one side by way of the pull-cables 6a and 6b. Such a single column 4c which is highly resistant to bending is shown in FIG. 10.

Figure 11:
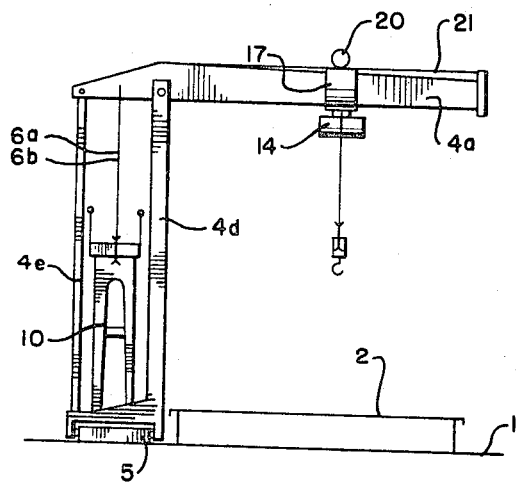
FIG. 11 is also a fragmentary longitudinal elevation showing a further embodiment of a crane having only one column assembly.

However, instead of the column 4c it is also possible, while maintaining the one-sided control and support of the traverse, to provide at the traverse 4a a pair of pivotally connected supports 4d and 4e as illustrated in FIG. 11. In this case also only set of pull-cables 6a and 6b is required to bring about the operation of the crane.

Figure 12:
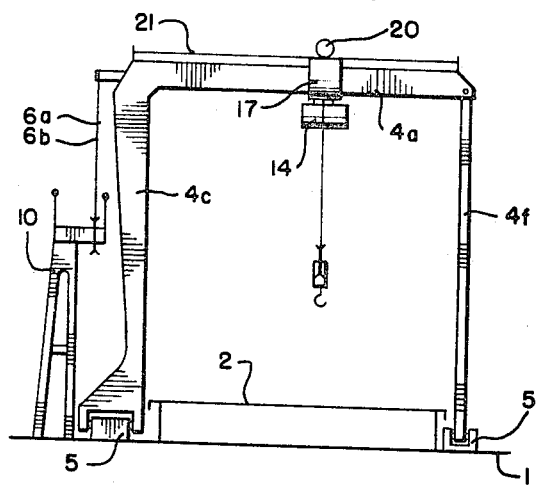
FIG. 12 is also a fragmentary longitudinal section showing yet another embodiment of a crane which has only one column.

Finally, while maintaining the one-sided control of the crane operations by means of one set of pull-cables 6a and 6b it is possible to situate a single column 4c which is highly resistant to bending, as shown in FIG. 12, and instead to locate at the other end of the traverse 4a a supporting bar 4f pivotally connected at its top end to the free end of the traverse 4a which is distant from the column 4c, and this bar or link 4f can be connected to the pivot 5 at its bottom end as shown in FIG. 12, so that in this way the free end of the traverse 4a will be supported.

Figure 13:
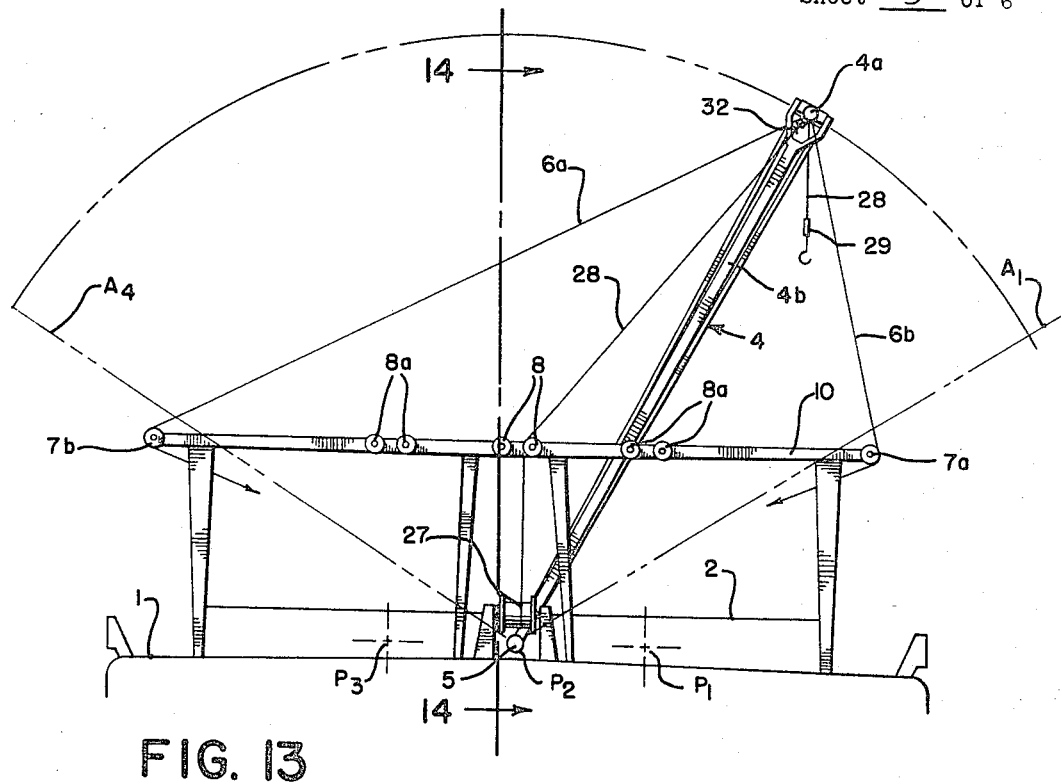
FIG. 13 is an elevation taken transversely of the deck of the ship and showing schematically another embodiment of the invention according to which the load hook is carried and actuated by a structure different from that of the above embodiment.
Figure 14:
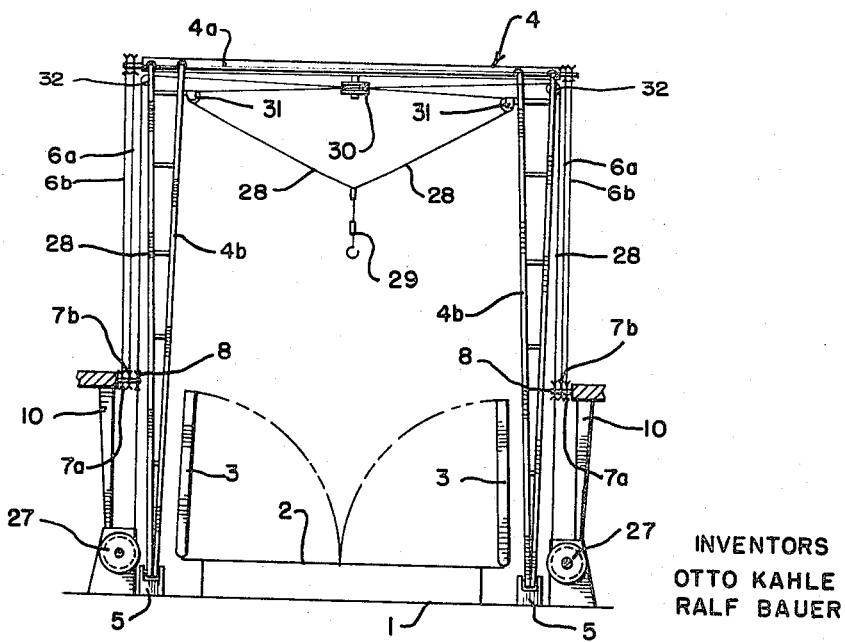
FIG. 14 is a fragmentary longitudinal schematic sectional elevation taken along line a—a of FIG. 13 in the direction of the arrows and showing further details of the structure of FIG. 13.

With the structure shown in FIGS. 13 and 14 there is situated beneath the stationary platform 10 before and after the crane 4 at the central longitudinal plane of the ship a pair of winches 27 from which the load-carrying cables 28 extend over the intermediate cable guide 8 to the upper end of the crane 4 where the cables 28 are guided around rollers 32 carried by the traverse means 4a at the opposite ends thereof. Thus, the winch 27 and cable guide 8 at one platform 10 can be situated as shown in FIG. 13 while at the other side the second winch 27 and the guide 8 will also have the position also indicated in FIG. 13. In the particular example illustrated the crane is shown as having its swinging axis situated beneath the winch 27, but of course the structure described above for locating the crane swing axes at the locations $P_1$ and $P_3$ can also be used.

The pair of load cables 28 respectively situated at the opposed columns 4b thus respectively extend around the rollers 32 with each cable 28 extending longitudinally along the traverse 4a from one end thereof toward the other end thereof. At this other end the particular cable is guided about a roller 31 carried by the column 4b at the inner side thereof. Thus, referring to FIG. 15 the left cable 28 extends around the illustrated roller 32 and then around an unillustrated roller 31 situated at the right column which is not visible in FIG. 15 while the left cable 28 extends from the other roller 32 which is not visible in FIG. 15 to the roller 31 which is shown in FIG. 15 around the latter in the manner illustrated. After thus passing around these rollers 31, which are carried at the inner sides of the columns adjacent the upper ends thereof, the free ends of the cables 28 are connected with the load hook 29. The cable guide 8 at the pair of stationary platforms 10 are situated directly over the winches 27 and the pivots 5, as shown in FIG. 13, but it is also possible to shift the winch 27 and pivots 5 to locations situated directly beneath the cable guide 8a shown to the right and left of the guide 8 in FIG. 13 in order to change the operating location of the crane in the manner described above.

As is apparent from FIG. 17, the cable rollers 32 are situated above the rollers 31, and as is also apparent from FIG. 17, as well as FIGS. 15 and 16, all of these guide rollers are carried by brackets which are swingable on pins which extend parallel to the traverse 4a so that all of the rollers can swing about axes which are parallel to the traverse 4a. As is apparent from FIGS. 18 and 19, the central part of the traverse beam 4a carries a roller 30 situated between the pair of cables 28 to separate them from each other and prevent them from rubbing against each other. This extending of the load cables from a guide roller 32 at one end of the traverse to the region of the opposite end thereof around a guide roller 31 carried by the opposite column has the advantage of distributing twist in the load cables, during swinging of the crane 4, throughout a relatively great length of the load cables, this length being increased by the length of the traverse 4a, so that in this way twisting of portions of the cables 28 which extend along the columns 4b can be compensated by twisting of the cables along the portions thereof extending along the traverse 4b.

The traverse beam, as a result of the selected location of the intermediate guide 8 or 8a as well as a result of the guide rollers 31 and 32, is stressed by bending moments to a only small extent and instead is subjected primarily to compression forces so that the traverse can have a relatively light construction. In other words the load acts on the cables 28 to provide through the latter forces on the opposed sets of rollers 31 and 32 which tend to advance these opposed sets toward each other to compress the traverse 4a and to minimize any tendency of the latter to bend. In this way the mass of the crane can be reduced.

Furthermore, by directing the load cables 28 around the guide 8 or 8a and the pull-cables 6a and 6b around the outer guides 7a and 7b, as shown in FIG. 13, the forces acting on the pull cables 6a and 6b are maintained relatively small. In order to relocate the crane, so that the pivot 5 has a different operating location, it is only necessary to place the load cables 28 around either one of the guides 8a situated to one or the other side of the guide 8 depending upon the new location of the pivot means 5, while the pull-cables 6a and 6b can remain operatively connected with the guides 7a and 7b in the manner shown in FIG. 13.

The travelling hoist 14 or the cables 28 can be controlled by suitable controls for the winches 27, in the case of cables 28, and by suitable controls for the traveling hoist 14 so that the load-carrying hook remains at a substantially constant elevation during swinging of the crane.

What is claimed is:

1. In a crane installation, column means having upper and lower ends and traverse means fixed to and extending laterally from said upper end of said column means to form a gantry crane therewith, pivot means carried by said column means at said lower end thereof, a pair of connecting means spaced from each other for releasable connection with said pivot means at said lower end of said column means to provide for the gantry crane a pair of mutually spaced parallel swing axes which extend parallel to said traverse means so that when one of said connecting means is connected to said column means said gantry crane will be swingable about one swing axis while when the other of said connecting means is operatively connected to said column means the gantry crane will swing about the other swing axis, pull-cable means operatively connected to said column means adjacent the upper end thereof for swinging said gantry crane about one or the other of said swing axes between a pair of end positions where said gantry crane is situated respectively in a pair of end planes which contain and intersect each other at one or the other of said swing axes and which make predetermined angles with a substantially vertical plane situated between said end planes and also containing one or the other of said swing axes, a pair of outer cable guide means for respectively coacting with said pull-cable means to provide turning points therefor, one of said outer cable guide means coacting with said pull cable means when said gantry crane is swingable about one of said swing axes which is nearer to said one outer cable guide means than the other of said swing axes, and the other of said outer cable guide means coacting with said pull cable means when said gantry crane is swingable about the other of said swing axes which is nearer to said other outer cable guide means than said one swing axis, and intermediate cable guide means situated between said pair of outer cable guide means and coacting with said pull cable means to provide for the latter a second turning point irrespective of which of said connecting means is connected to said column means, said one outer cable guide means being situated in a plane which bisects said angle between one of said end planes and said substantially vertical plane and said intermediate cable guide means being situated in a plane which bisects the angle between the other of said end planes and said vertical plane when the connecting means which provides said one swing axis is operatively connected to said column means, and said other outer cable guide means being situated in a plane which bisects the angle between said other end plane and a vertical plane which contains the other of said swing axes when the other connecting means provides for said column means swinging movement about said other swing axis, and when said crane is at the latter axis said intermediate cable guide means being situated in a plane which bisects the angle between said one end plane and a vertical plane which contains said other swing axis, and a pair of column guide means respectively located adjacent said outer cable guide means and respectively coacting with said column means to guide the latter for longitudinal movement and for turning movement about a pair of axes respectively parallel to said swing axes and respectively situated adjacent said pair of outer cable guide means, said pair of column guide means being removably connectable with said column means to coact therewith during shifting of the lower end of said column means from one to the other of said connecting means, whereby said pull-cable means may be operated when one of said column guide means is connected with said column means and the connecting means which is nearer to the outer cable guide means which is adjacent to said one column guide means is disconnected from said column means to provide for longitudinal shifting and turning movement of said column means while the lower end thereof becomes situated at the other of said connecting means, after which the latter can be connected to the lower end of said column means to provide for the gantry crane swinging movement about the swing axis provided by said other connecting means.

2. The combination of claim 1 and wherein each connecting means is situated substantially equidistant from said traverse means when said crane is situated in said end planes and is supported for swinging movement by the latter connecting means.

3. The combination of claim 1 and wherein a stationary platform means from, which the gantry crane is controlled during its operation, is situated beside said column means and carries said pair of outer and said intermediate cable guide means.

4. The combination of claim 1 and wherein said traverse means carries a traveling hoist assembly for longitudinal movement along said traverse means in the direction of a longitudinal axis thereof, and support means supporting said traveling hoist for angular movement with respect to said longitudinal axis of said traverse means.

5. The combination of claim 1 and wherein said column means includes a pair of end columns which are parallel to each other and which have upper ends between which said traverse means extends.

6. The combination of claim 1 and wherein said column means includes a single column structure connected only to one end of said traverse means which extends in cantilever fashion from said single column structure, and said pull-cable means as well as said pair of connecting means coacting only with said single column structure.

7. The combination of claim 6 and wherein said traverse means has a free end distant from said single column structure, and elongated support means pivotally connected to and suspended from said free end of said traverse means for supporting the latter.

8. The combination of claim 1 and wherein a traveling hoist is carried by said traverse means for longitudinal movement therealong, said traveling hoist including a load-carrying hook and control means coacting with said hoist for controlling the latter to maintain said hook at approximately a constant elevation during swinging of said crane.

9. The combination of claim 1 and wherein an elongated platform is situated beside said column means to provide a location from which the swinging of said crane means can be controlled, said pair of outer cable guide means and said intermediate cable guide means being carried by said platform and said platform being situated in a horizontal plane which intersects one of said end planes when one of said connecting means coacts with said column means and which intersects the other of said end planes when the other of said connecting means coacts with said column means, and said pair of outer cable guide means respectively being situated adjacent the intersections between said horizontal plane and the latter end planes.

10. The combination of claim 1 and wherein the elongated stationary platform is situated beside said column means to provide a location from which the crane can be controlled, said platform carrying said pair of outer cable guide means and said intermediate cable guide means, and said pull-cable means including a winch situated directly beneath said intermediate cable guide means and a cable extending from said winch over said intermediate cable guide means to the region of an upper end of said column means, said column means including a pair of opposed end columns between which said traverse means extends with said end columns extending downwardly from the opposed ends of said traverse means, said traverse means carrying at said opposed ends thereof a pair of outer guide rollers around which a pair of cables are guided from a pair of said winches with said cables extending about the intermediate guide means carried by a pair of said platforms situated adjacent the opposed end columns, and said end columns respectively carrying in the region of their upper ends a pair of guide rollers situated inwardly of said rollers at the ends of said traverse means, each cable extending about the guide roller at one end of said traverse means to the guide roller at the inner side of the opposed end column and then back toward the center of said traverse means where said cables respectively terminate in free ends, and a crane hook connected to said free ends of said cables substantially centrally beneath said traverse means.

11. The combination of claim 10 and wherein said rollers at the ends of said traverse means are situated at an elevation higher than said rollers at the inner sides of the upper end regions of said end columns with the latter rollers and said rollers at the ends of said traverse means all being supported for swinging movement about axes parallel to the longitudinal axis of said traverse means.

12. The combination of claim 10 and wherein said traverse means carries at a substantially central region thereof an intermediate guide roller engaging the cable where they cross each other to prevent rubbing of said cables against each other.

References Cited

UNITED STATES PATENTS

| 373,255 | 11/1887 | Thornburgh | 212—8 |
| 1,111,102 | 9/1914 | Sawyer | 212—8 |
| 1,817,859 | 8/1931 | Venezian | 212—8 |

EVON C. BLUNK, *Primary Examiner.*

H. C. HORNSBY, *Assistant Examiner.*

U.S. Cl X.R.

212—3, 13, 70